(12) United States Patent
Cheng et al.

(10) Patent No.: US 11,835,265 B2
(45) Date of Patent: Dec. 5, 2023

(54) APPARATUS COMBINING SOLAR TRACKER AND DUAL HEAT SOURCE COLLECTOR

(71) Applicant: NATIONAL CHENG KUNG UNIVERSITY, Tainan (TW)

(72) Inventors: Ching-Hsiang Cheng, Tainan (TW); Tsung-Chieh Cheng, Tainan (TW); Yen-Fei Chen, Tainan (TW); Yu-Ting Lin, Tainan (TW); Shang-Ting Huang, Tainan (TW)

(73) Assignee: National Cheng Kung University, Tainan (TW)

( * ) Notice: Subject to any disclaimer, the term of this patent is extended or adjusted under 35 U.S.C. 154(b) by 464 days.

(21) Appl. No.: 17/106,770

(22) Filed: Nov. 30, 2020

(65) Prior Publication Data

US 2022/0170669 A1 Jun. 2, 2022

(51) Int. Cl.
| | |
|---|---|
| *F24S 20/40* | (2018.01) |
| *F24S 70/60* | (2018.01) |
| *F24S 50/80* | (2018.01) |
| *F24S 80/60* | (2018.01) |
| *F24S 23/70* | (2018.01) |
| *F24S 23/79* | (2018.01) |
| *F24S 23/71* | (2018.01) |

(52) U.S. Cl.
CPC ............... *F24S 20/40* (2018.05); *F24S 50/80* (2018.05); *F24S 70/60* (2018.05); *F24S 23/71* (2018.05); *F24S 23/79* (2018.05); *F24S 80/60* (2018.05); *F24S 2023/872* (2018.05)

(58) Field of Classification Search
CPC ................................ Y02E 10/47; Y02E 10/46
See application file for complete search history.

(56) References Cited

U.S. PATENT DOCUMENTS

| | | | | |
|---|---|---|---|---|
| 4,642,988 A | * | 2/1987 | Benson ................. | F02G 1/0435 60/659 |
| 4,745,749 A | * | 5/1988 | Benson ..................... | F02G 1/06 60/520 |
| 5,586,549 A | * | 12/1996 | Hartenstine ........... | F24H 1/0036 165/104.21 |

(Continued)

FOREIGN PATENT DOCUMENTS

| | | |
|---|---|---|
| CN | 201071767 Y * | 6/2008 |
| CN | 202065137 U | 12/2011 |

(Continued)

*Primary Examiner* — Jorge A Pereiro
(74) *Attorney, Agent, or Firm* — Rosenberg, Klein & Lee

(57) ABSTRACT

An apparatus combining a solar tracker and a dual heat source collector includes a heat engine assembly and the solar tracker. The heat engine assembly includes a heat collector, a heat collecting lens, and a heat engine. The heat collector includes a solar heat collecting room and a heat source room. The heat collecting lens is arranged on the heat collector and corresponds to the solar heat collecting room. The heat engine is located in the solar heat collecting room. The solar tracker includes a primary mirror, a secondary mirror, a pivot member, and a driving member. The primary mirror has a first reflective surface and a back surface. The primary mirror has a mounting hole passing through the primary mirror. The secondary mirror is mounted above the primary mirror.

8 Claims, 10 Drawing Sheets

(56) References Cited

U.S. PATENT DOCUMENTS

| | | | | |
|---|---|---|---|---|
| 9,903,585 B1* | 2/2018 | Crowder | ............. | F23C 13/02 |
| 2004/0031517 A1* | 2/2004 | Bareis | ............. | F24S 23/79 |
| | | | | 136/246 |
| 2008/0163922 A1* | 7/2008 | Horne | ............. | G02B 19/0023 |
| | | | | 136/246 |
| 2009/0205636 A1* | 8/2009 | Gangemi | ............. | F24S 23/75 |
| | | | | 126/573 |
| 2009/0225426 A1* | 9/2009 | Horne | ............. | F24S 50/60 |
| | | | | 359/585 |
| 2009/0320830 A1* | 12/2009 | Bennett | ............. | F24S 23/71 |
| | | | | 126/684 |
| 2011/0017269 A1* | 1/2011 | Fangman | ............. | H02S 20/32 |
| | | | | 136/246 |
| 2011/0174359 A1* | 7/2011 | Goei | ............. | F24S 23/71 |
| | | | | 136/246 |
| 2012/0216538 A1* | 8/2012 | Garaway | ............. | F02G 1/055 |
| | | | | 60/641.14 |
| 2012/0266938 A1* | 10/2012 | Goei | ............. | F24S 40/55 |
| | | | | 136/246 |
| 2016/0208736 A1* | 7/2016 | Yaun | ............. | F03G 6/068 |

FOREIGN PATENT DOCUMENTS

| | | | | | |
|---|---|---|---|---|---|
| CN | 105240228 A | | 1/2016 | | |
| CN | 209228487 U | * | 8/2019 | ............. | F02G 1/055 |
| TW | I516732 B | | 1/2016 | | |

* cited by examiner

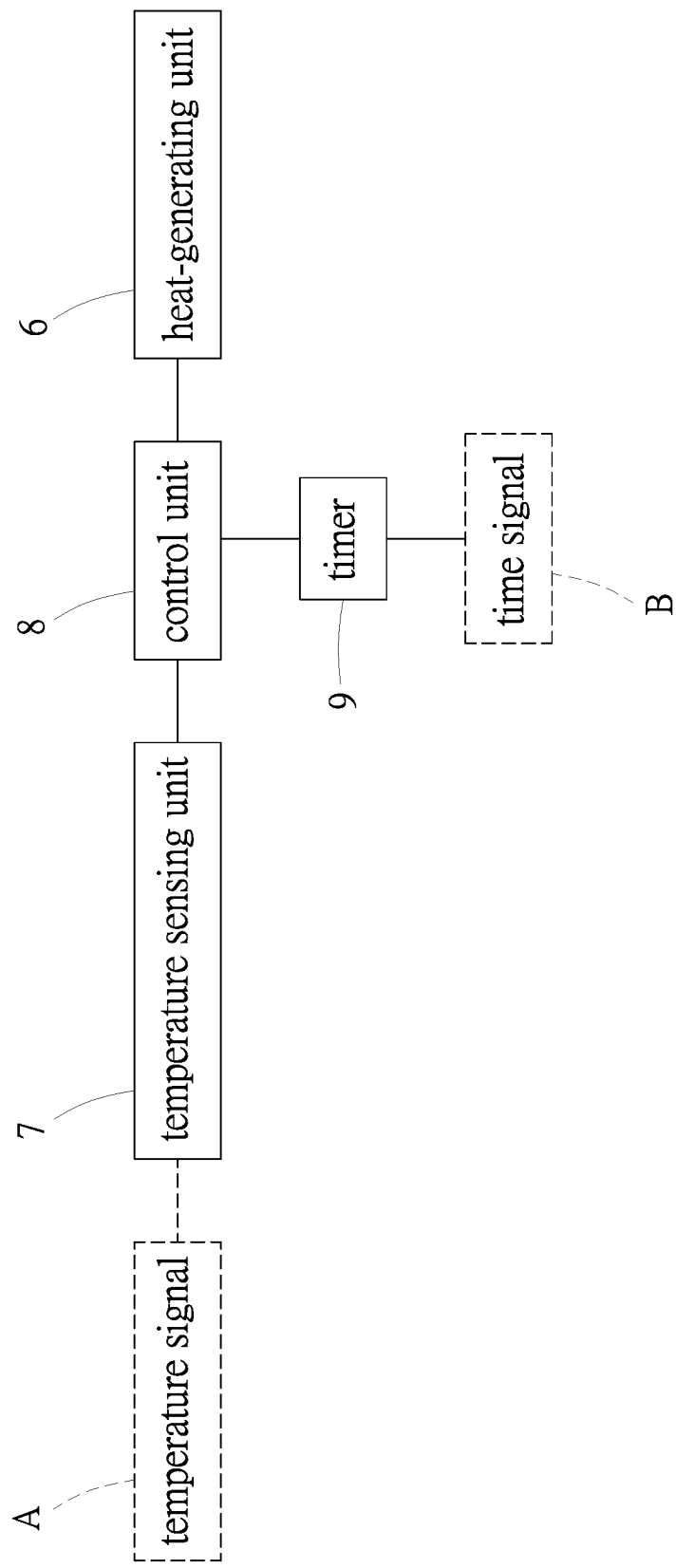
F I G . 2

APPARATUS COMBINING SOLAR TRACKER AND DUAL HEAT SOURCE COLLECTOR

FIELD OF THE INVENTION

The present invention relates to an apparatus combining a solar tracker and a dual heat source collector, and more particularly to a dual heat source heat engine assembly mounted at a specific position of the solar tracker, having a better effect of tracking sunlight.

BACKGROUND OF THE INVENTION

A conventional solar-powered heat engine can only use solar energy. Therefore, it can only run when there is sun, and it will shut down when there is no sun. It is a passive system. The sun will move with time, so the solar-powered heat engine is equipped with a heat collector. The heat collector has three types of application, that is, a central heat collection, a groove heat collection and a dish heat collection.

For example, Taiwan Patent Publication No. 1516732 discloses a power generator with a solar focused Stirling engine. A Stirling engine is a heat engine that is operated by a cyclic compression and expansion of air or other gas (the working fluid) at different temperatures, resulting in a net conversion of heat energy to mechanical work. The power generator is a solar focused power generator. In order to maintain the efficiency of solar power generation, the power generator is provided with a sunlight tracking system to reduce the inactivity of the Stirling engine due to the insufficient focus temperature caused by the sun's moving position and to maintain the output electric power.

A conventional solar tracking system applied to the Stirling engine is a dish heat collector. As shown in FIG. 10, the solar tracking system comprises a solar tracker 2A. The solar tracker 2A includes a mirror 21A, a support frame 22A, a pivot member 23A, and a driving member 24A. A Stirling engine 1A is mounted above the mirror 21A through the support frame 22A. The mirror 21A is connected to the pivot member 23A. The pivot member 23A is connected to the driving member 24A. The Stirling engine 1A and the mirror 21A are driven by the driving member 24A of the solar tracker 2A to pivot for following the sunlight. This structure has the following shortcomings: (1) The Stirling engine 1A is mounted above the mirror 21A through the support frame 22A, so the Stirling engine 1A is higher than the mirror 21A. Therefore, the overall structure is heavier and difficult to change the angle and consumes more electricity. (2) The Stirling engine 1A is installed at the focal point of the mirror 21A, and the temperature of the focal point may be as high as thousands of degrees. The Stirling engine 1A is easily damaged because of long-term exposure to the sunlight. (3) Since the Stirling engine 1A is installed above the mirror 21A, there is a concern that the parts of the Stirling engine 1A may fall and hit the mirror 21A to cause damages.

In addition, although the Stirling engine is equipped with the solar tracking system, the Stirling engine will not work if it is cloudy, rainy and at night. Therefore, it is necessary to provide an additional energy storage system, such as a large battery to store electrical energy or a molten-salt battery to store thermal energy, for continuously driving the Stirling engine. However, no matter whether it is stored in the form of electric or thermal energy, the cost of the apparatus increases, and the energy of the energy storage system is limited. The operational efficiency of the Stirling engine is not high when it is used in a rainy day or in an area lacking sunlight.

SUMMARY OF THE INVENTION

According to one aspect of the present invention, an apparatus combining a solar tracker and a dual heat source collector is provided. The apparatus comprises a heat engine assembly and the solar tracker. The heat engine assembly includes a heat collector, a heat collecting lens, and a heat engine. The heat collector includes a solar heat collecting room and a heat source room. The heat collecting lens is arranged on the heat collector and corresponds to the solar heat collecting room. The heat collecting lens is configured to focus sunlight on the solar heat collecting room to generate a solar thermal energy. The heat source room is configured to generate or receive a heating thermal energy. A heat transfer wall is provided between the solar heat collecting room and the heat source room to separate the solar heat collecting room and the heat source room into two spaces. The heating thermal energy is transferred to the solar heat collecting room through the heat transfer wall. The heat engine is located in the solar heat collecting room. The solar tracker includes a primary mirror, a secondary mirror, a pivot member, and a driving member. The primary mirror has a first reflective surface and a back surface. The primary mirror has a mounting hole passing through the first reflective surface and the back surface. The secondary mirror is mounted above the primary mirror. The secondary mirror has a second reflective surface facing the first reflective surface and focusing on the mounting hole. The heat engine assembly is mounted to the back surface of the primary mirror. The heat collecting lens corresponds to the mounting hole. The primary mirror or the heat engine assembly is pivotally connected to the pivot member. The pivot member is connected to the driving member.

According to another aspect of the present invention, an apparatus combining a solar tracker and a dual heat source collector is provided. The apparatus comprises a heat engine assembly and a solar tracker. The heat engine assembly includes a heat collector, a heat collecting lens, and a heat engine. The heat collector includes a solar heat collecting room and a heat source room. The heat collecting lens is arranged on the heat collector and corresponds to the solar heat collecting room. The heat collecting lens is configured to focus sunlight on the solar heat collecting room to generate a solar thermal energy. The heat source room is configured to generate or receive a heating thermal energy. A heat transfer wall is provided between the solar heat collecting room and the heat source room to separate the solar heat collecting room and the heat source room into two spaces. The heating thermal energy is transferred to the solar heat collecting room through the heat transfer wall. The heat engine is located in the solar heat collecting room. The solar tracker includes a primary mirror, a secondary mirror, a pivot member, a driving member, and a pivot block. The primary mirror has a first reflective surface and a back surface. The primary mirror has a mounting hole passing through the first reflective surface and the back surface. The secondary mirror is mounted above the primary mirror. The secondary mirror has a second reflective surface facing the first reflective surface and focusing on the mounting hole. The heat engine assembly is mounted to the back surface of the primary mirror. The heat collecting lens corresponds to the mounting hole. The pivot block is connected to the back surface of the primary mirror. The pivot member is pivotally connected to the pivot block. The pivot member is connected to the driving member.

Preferably, the heat collecting lens is a Fresnel lens.

Preferably, the heat collecting lens is insertedly disposed in the mounting hole and extends out of the first reflecting surface of the primary mirror.

Preferably, the secondary mirror has a surface area greater than that of the heat collecting lens.

Preferably, the apparatus further comprises a heat absorption member disposed in the solar heat collecting room and connected to the heat engine. The heat absorption member is configured to receive the solar thermal energy or/and the heating thermal energy.

Preferably, an outer wall of the heat source room is wrapped with a heat insulation layer.

Preferably, the apparatus further comprises a heat-generating unit. The heat-generating unit is configured to receive a fuel to burn to generate the heating thermal energy. The heating thermal energy is transmitted to the heat source room. The heat collector further has a vent communicating with the heat source room.

Preferably, the apparatus further comprises a control unit and a temperature sensing unit. The temperature sensing unit is disposed in the solar heat collecting room. The control unit is electrically connected to the temperature sensing unit and the heat-generating unit. The temperature sensing unit is configured to detect a temperature signal. The control unit receives the temperature signal and controls the heat-generating unit to start or shut down according to the temperature signal.

Preferably, the apparatus further comprises a control unit and a timer. The control unit is electrically connected to the timer and the heat-generating unit. The timer is configured to set a time signal. The control unit receives the time signal and controls the heat-generating unit to start or shut down according to the time signal.

The above technical features have the following effects:

1. The present invention has the heat engine assembly and the solar tracker. The heat engine assembly is mounted to the back surface the primary mirror of the solar tracker. The heat collecting lens of the heat engine assembly is arranged in the mounting hole of the solar tracker, so that the heat engine assembly is not higher than the primary mirror, reducing the load of the driving member of the solar tracker. Reducing the load is easier to change the angle. Only the heat collecting lens is connected to the primary mirror, and most of the heat engine assembly is shielded by the primary mirror. The secondary mirror corresponds to the heat collecting lens of the heat engine assembly, so that only the heat collecting lens of the heat engine assembly receives the sunlight focused by the secondary mirror, so as to prevent the heat engine assembly from being damaged due to long-term exposure to the sunlight. This structure can prevent the objects on the heat engine assembly from falling and damaging the primary mirror and the secondary mirror.
2. Through the solar heat collecting room and the heat source room of the present invention, the heat engine can be operated by the solar thermal energy generated by the solar heat collecting room in a sunny day. In cloudy days, rainy days and nights, the heat engine can be operated by the heating thermal energy generated by the heat-generating unit. The dual-heat source solar heat engine can continue to operate regardless of weather and time.
3. The heat collecting lens of the present invention extends out of the first reflecting surface of the primary mirror, and the surface area of the secondary mirror is greater than the surface area of the heat collecting lens. The sunlight focused by the secondary mirror can completely irradiate the heat collecting lens, which improves the efficiency of the dual heat source solar heat engine.
4. The present invention can sense the temperature of the solar heat collecting room through the temperature sensing unit. When the temperature of the solar heat collecting room is insufficient, the heat-generating unit is controlled to generate heating thermal energy; alternatively, a timer can be used to set the time when there is no sunlight at night to control the heat-generating unit to generate heating thermal energy. This maintains the stable operation of the heat engine.
5. The heat source room of the present invention surrounds the periphery of the solar heat collecting room, so as to uniformly transfer heat to the solar heat collecting room. The heat source room is covered with a heat insulation layer, so as to prevent the heating thermal energy from flowing out and to improve energy efficiency.
6. In the present invention, only the heat collecting lens is connected to the primary mirror, and most of the heat engine assembly is shielded by the primary mirror, so as to prevent the combustible gas in the heat source room from being heated and burned or lost.

BRIEF DESCRIPTION OF THE DRAWINGS

FIG. 2 is a block diagram of using the temperature signal of the temperature sensing unit or the time signal of the timer to activate the heat-generating unit according to the first embodiment of the present invention;

DESCRIPTION OF THE PREFERRED EMBODIMENTS

Embodiments of the present invention will now be described, by way of example only, with reference to the accompanying drawings.

Figure 1:
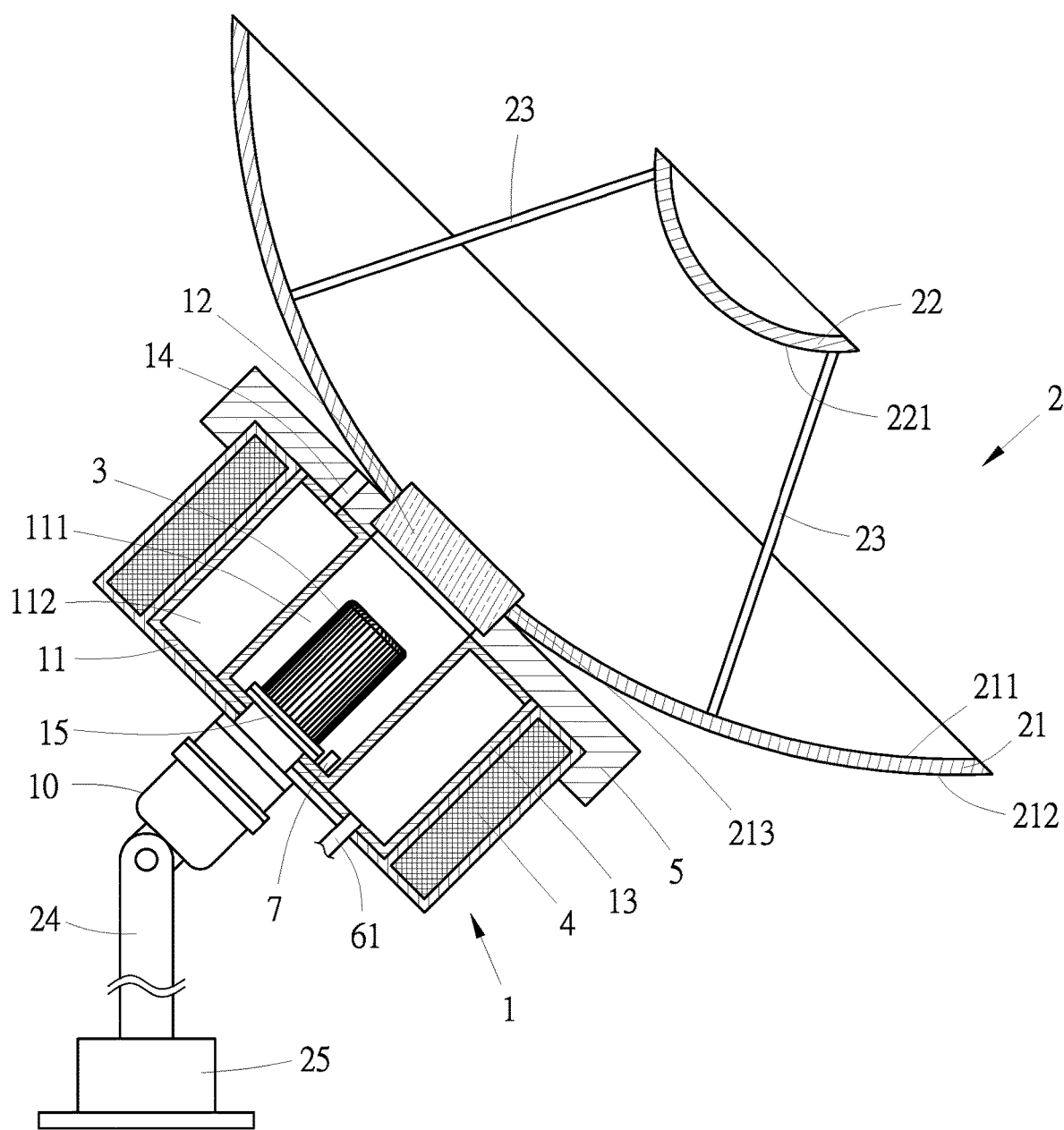
FIG. 1 is a schematic view of the apparatus combining the solar tracker and the dual heat source collector according to a first embodiment of the present invention.

As shown in FIG. 1 and FIG. 2, an apparatus combining a solar tracker and a dual heat source collector according to a first embodiment of the present invention comprises a heat engine assembly 1 and a solar tracker 2. It should be noted that the figures of the embodiment of the present invention are presented in schematic diagrams. The specific structures may be in different forms depending on the process technology. The heat engine assembly 1 is a dual heat source solar heat engine. The heat engine assembly 1 includes a heat collector 11, a heat collecting lens 12, and a heat engine 15. The heat collector 11 includes a solar heat collecting room 111 and a heat source room 112. A heat transfer wall 13 is provided between the solar heat collecting room 111 and the heat source room 112. The material of the heat transfer wall 13 is similar to the metal inner tank of a water heater, which has a high heat transfer coefficient and can resist oxidation. The heat transfer wall 13 separates the solar heat collecting room 111 and the heat source room 112 into two spaces. In this embodiment, the heat source room 112 surrounds the periphery of the solar heat collecting room 111. The heat engine 15 is located in the solar heat collecting room 111. Specifically, the heat engine 15 is, for example, a Stirling engine. The expansion cylinder of the Stirling engine extends into the solar heat collecting room 111. The heat engine 15 is covered with a heat absorption member, such as a heat pipe 3. A power generation unit 10 is connected to the heat engine 15. For example, the power generation unit 10 is connected to a piston connecting rod of the Stirling engine. The dual heat source solar heat engine further includes a heat insulation layer 4 attached to the outer wall of the heat source room 112. For example, a hollow layer of a hollow container is provided with an asbestos layer, and the heat collector 11 is placed in the hollow container. The heat collecting lens 12 is a Fresnel lens. The heat collecting lens 12 is arranged on the heat collector 11 so that the heat collecting lens 12 corresponds to the solar heat collecting room 111. Specifically, a cover 5 covers the heat collector 11. The center of the cover 5 is hollow. The heat collecting lens 12 is supported on the cover 5. The dual heat source solar heat engine is connected to a heat-generating unit 6. The heat-generating unit 6 is connected to the heat source room 112 through a conveying pipe 61. The solar tracker 2 has a primary mirror 21, a secondary mirror 22, two support frames 23, a pivot member 24, and a driving member 25. The primary mirror 21 has a first reflective surface 211 and a back surface 212. The primary mirror 21 has a mounting hole 213 passing through the first reflective surface 211 and the back surface 212. The secondary mirror 22 is mounted above the primary mirror 21 through the two support frames 23, so that the secondary mirror 22 is higher than the primary mirror 21. The secondary mirror 22 has a second reflective surface 221 facing the first reflective surface 211 and focusing on the mounting hole 213. The heat engine assembly 1 is mounted to the back surface 212 of the primary mirror 21. The heat collecting lens 12 is fixed to the mounting hole 213. The heat collecting lens 12 extends out of the first reflective surface 211 of the primary mirror 21. The heat engine assembly 1 is pivotally connected to the pivot member 24. The pivot member 24 is connected to the driving member 25.

Referring to FIG. 1 and FIG. 2, the dual heat source solar heat engine of this embodiment further includes a temperature sensing unit 7, a control unit 8, and a timer 9. The temperature sensing unit 7 is disposed in the solar heat collecting room 111. The control unit 8 is electrically connected to the temperature sensing unit 7, the timer 9 and the heat-generating unit 6.

Figure 3:
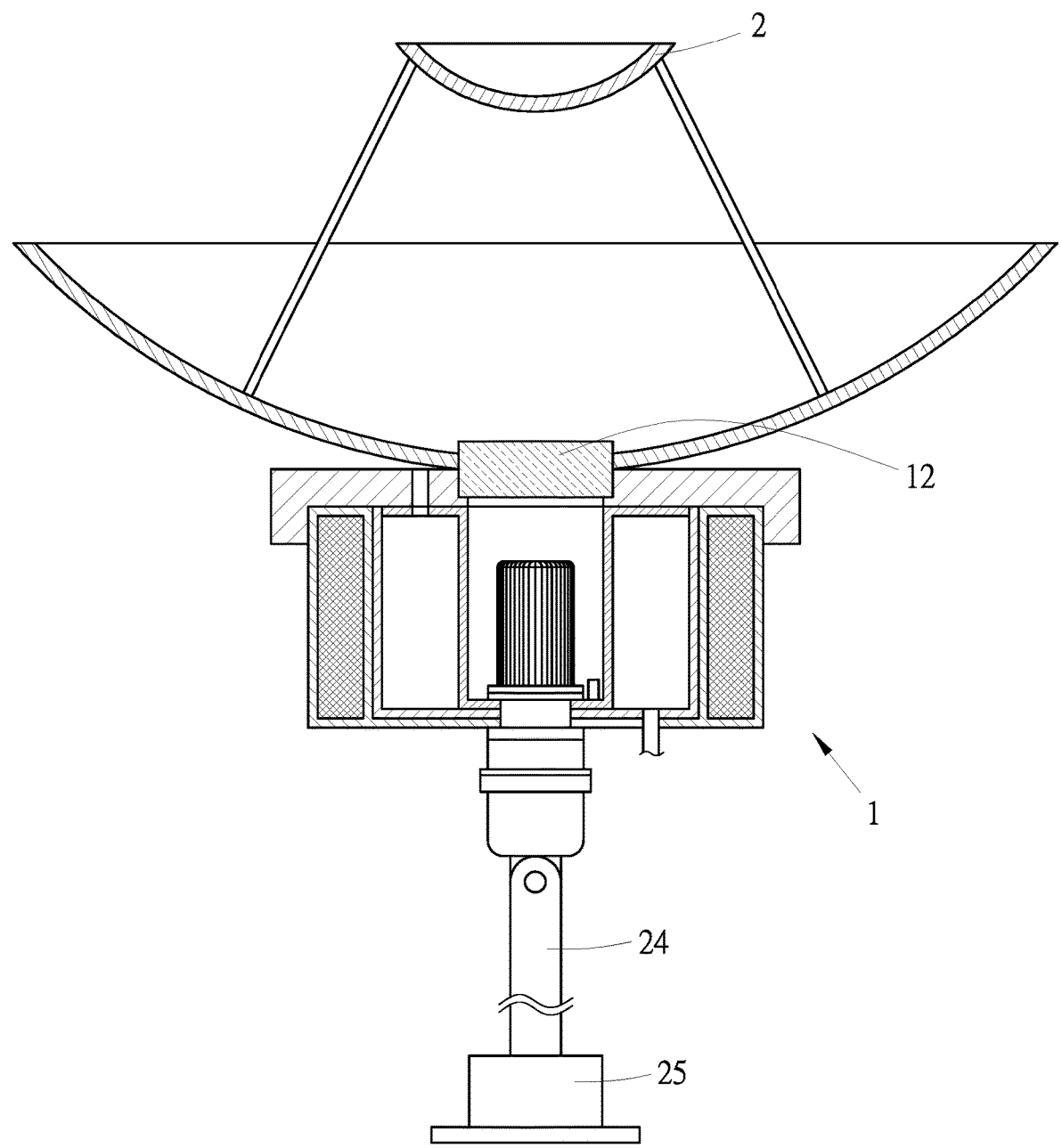
FIG. 3 is a schematic view of the apparatus combining the solar tracker and the dual heat source collector according to the first embodiment of the present invention when it is not operating.
Figure 4:
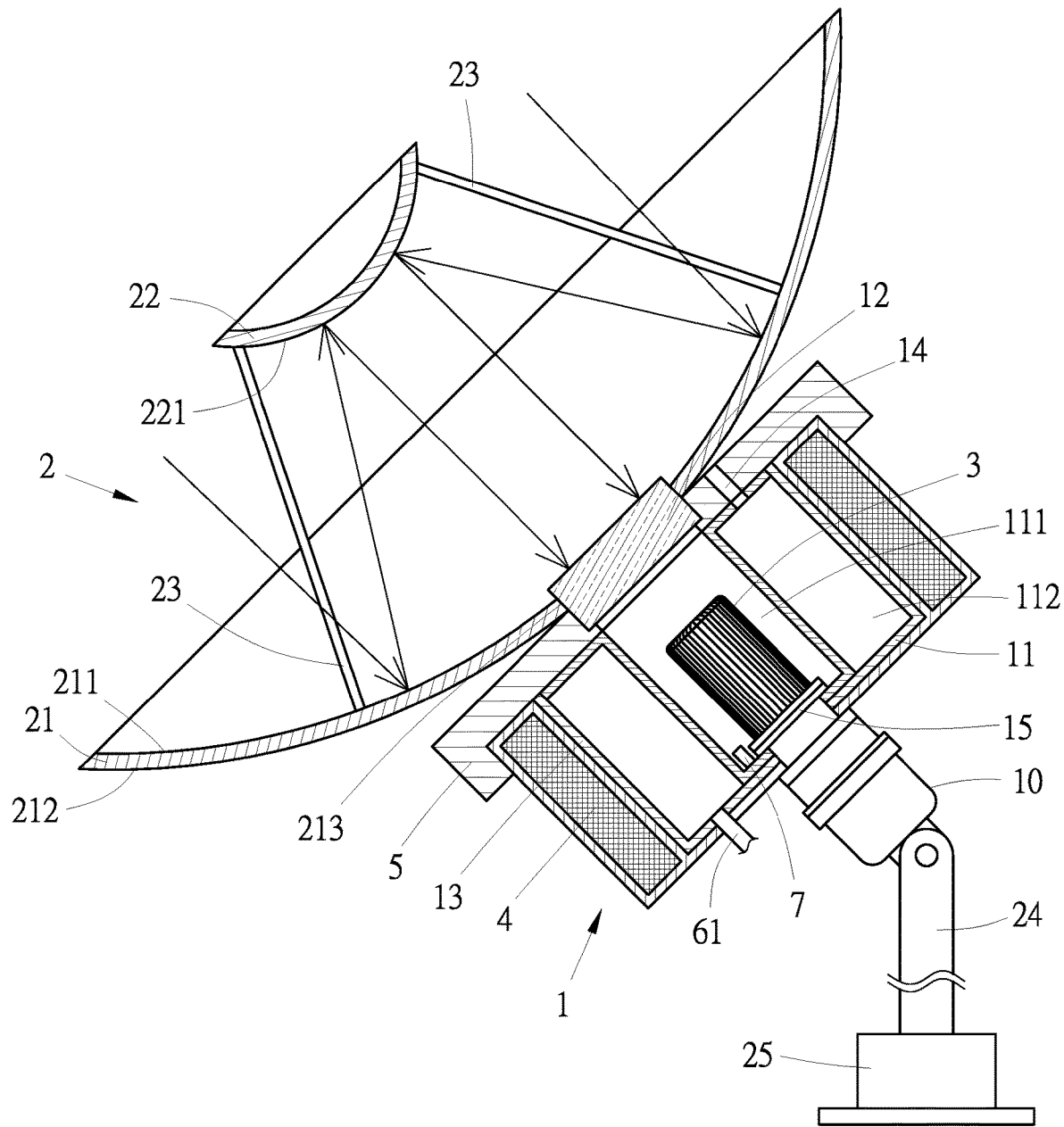
FIG. 4 is a schematic view of the apparatus combining the solar tracker and the dual heat source collector according to the first embodiment of the present invention when it is operating.

FIG. 3 illustrates the state that the apparatus combining the solar tracker and the dual heat source collector is not in operation. The surface area of the secondary mirror 22 is greater than the surface area of the heat collecting lens 12, so that the secondary mirror 22 can block the heat collecting lens 12 to prevent objects from falling and hitting the heat collecting lens 12 directly, causing the heat engine assembly 1 to fail or reduce the power generation efficiency of the heat engine assembly 1. Referring to FIG. 4, when the sunlight is sufficient, the solar tracker 2 moves with the sun. Sunlight irradiates the first reflective surface 211 of the primary mirror 21, is reflected from the first reflective surface 211 to the second reflective surface 221 of the secondary mirror 22, and then is focused on the heat collecting lens 12 by the second reflective surface 221, so that the heat collecting lens 12 of the heat engine assembly 1 can receive the most sunlight. Sunlight passes through the heat collecting lens 12 to focus solar thermal energy on the heat engine 15, so that the heat engine 15 absorbs enough solar thermal energy to drive the power generation unit 10 to generate electricity, thereby converting the solar thermal energy into electric energy. Receiving the solar thermal energy through the heat pipe 3 can increase the surface area of heat absorption of the heat engine 15 to further improve the thermal efficiency. It should be noted that only the heat collecting lens 12 extends out of the primary mirror 21. Most of the heat engine assembly 1 is shielded by the primary mirror 21 to prevent the heat engine assembly 1 from being exposed to sunlight for a long time, so as to avoid the situation that the parts of the heat engine assembly 1 may be damaged or that the combustible gas in the heat source room 112 is subject to high temperature and burns and is lost.

Figure 5:
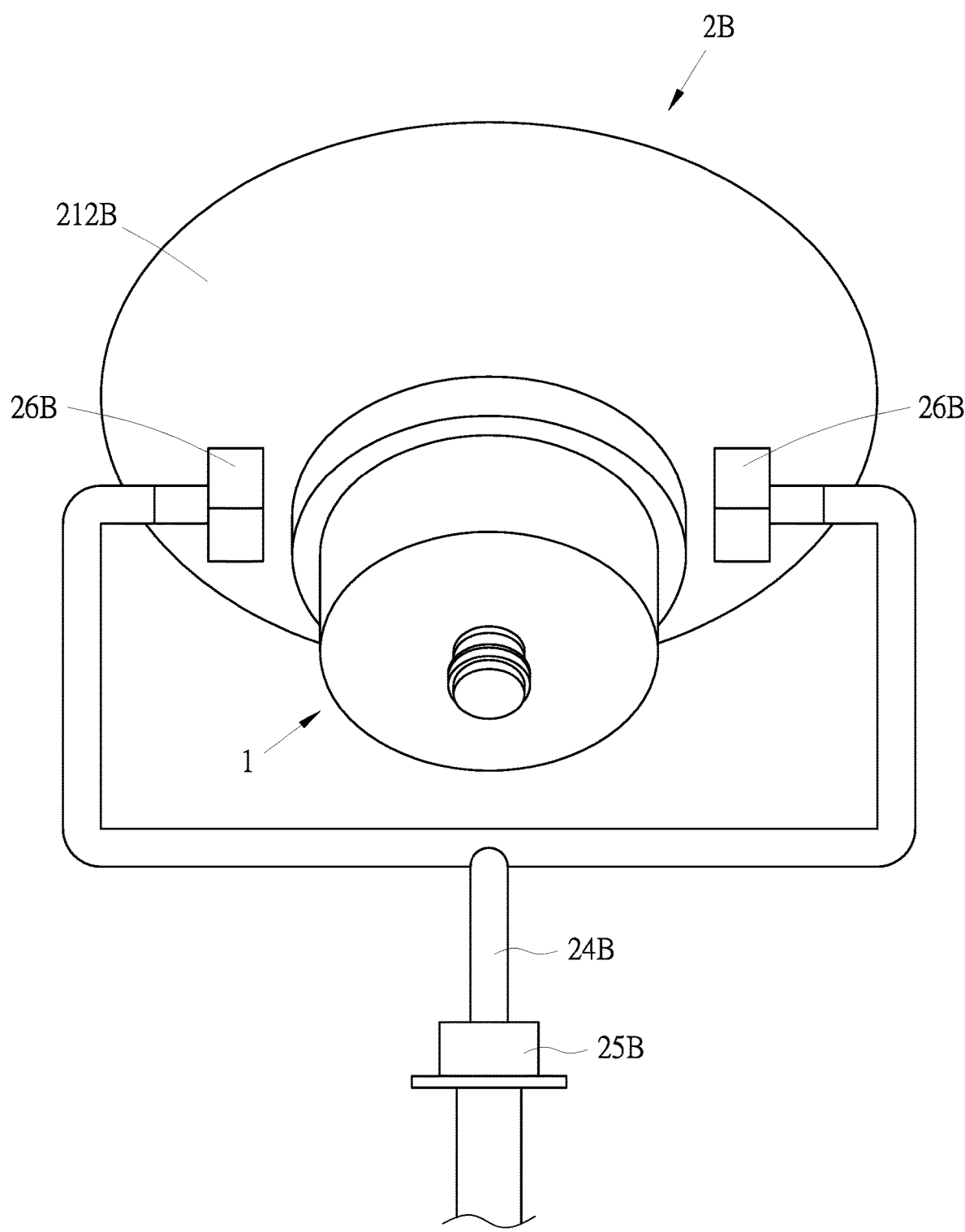
FIG. 5 is a schematic view according to a second embodiment of the present invention, wherein the pivot blocks are connected to the back surface of the primary mirror and the pivot member is pivotally connected to the pivot block.
Figure 6:
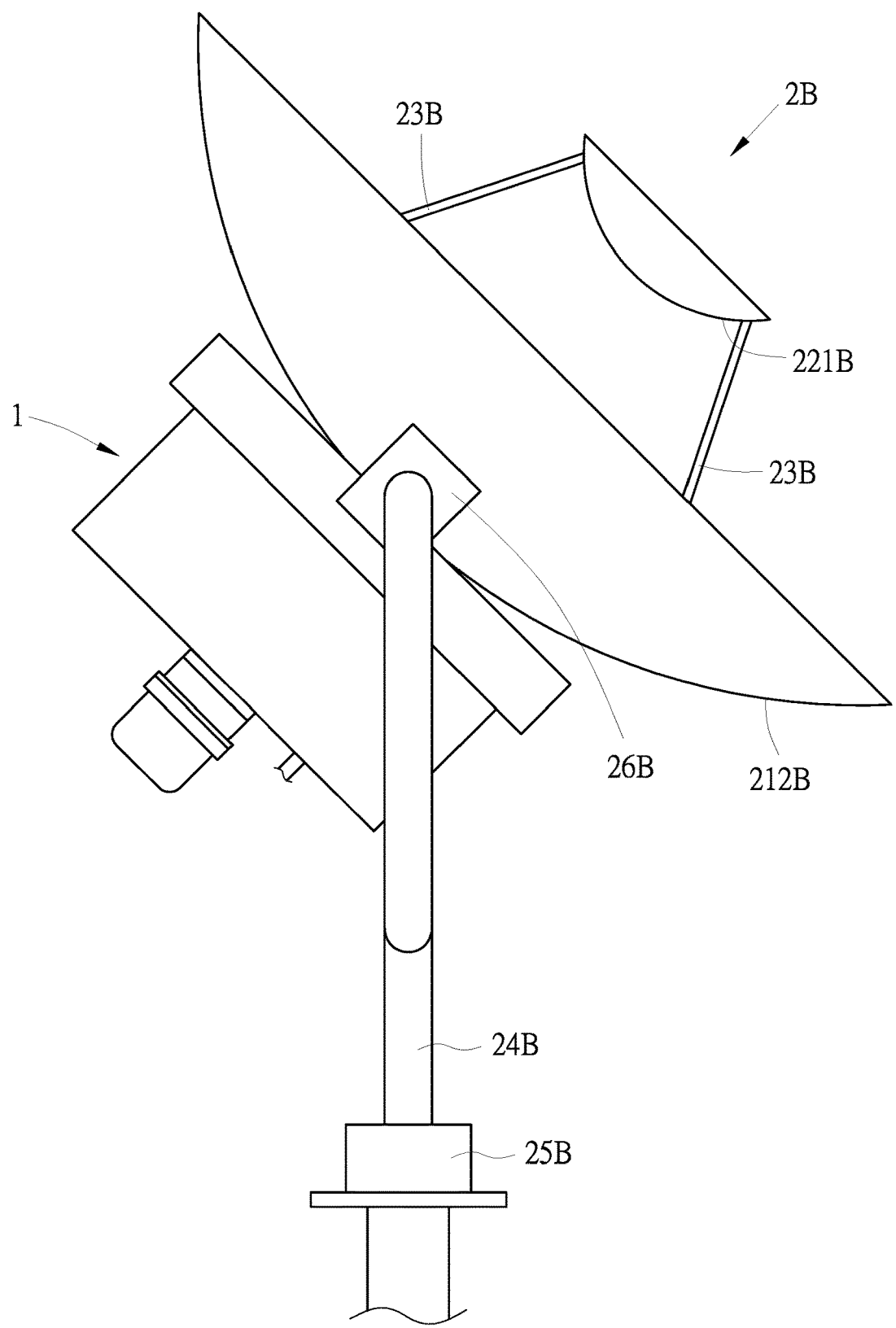
FIG. 6 is a side view according to the second embodiment of the present invention, wherein the pivot blocks are connected to the back surface of the primary mirror and the pivot member is pivotally connected to the pivot block.
Figure 7:
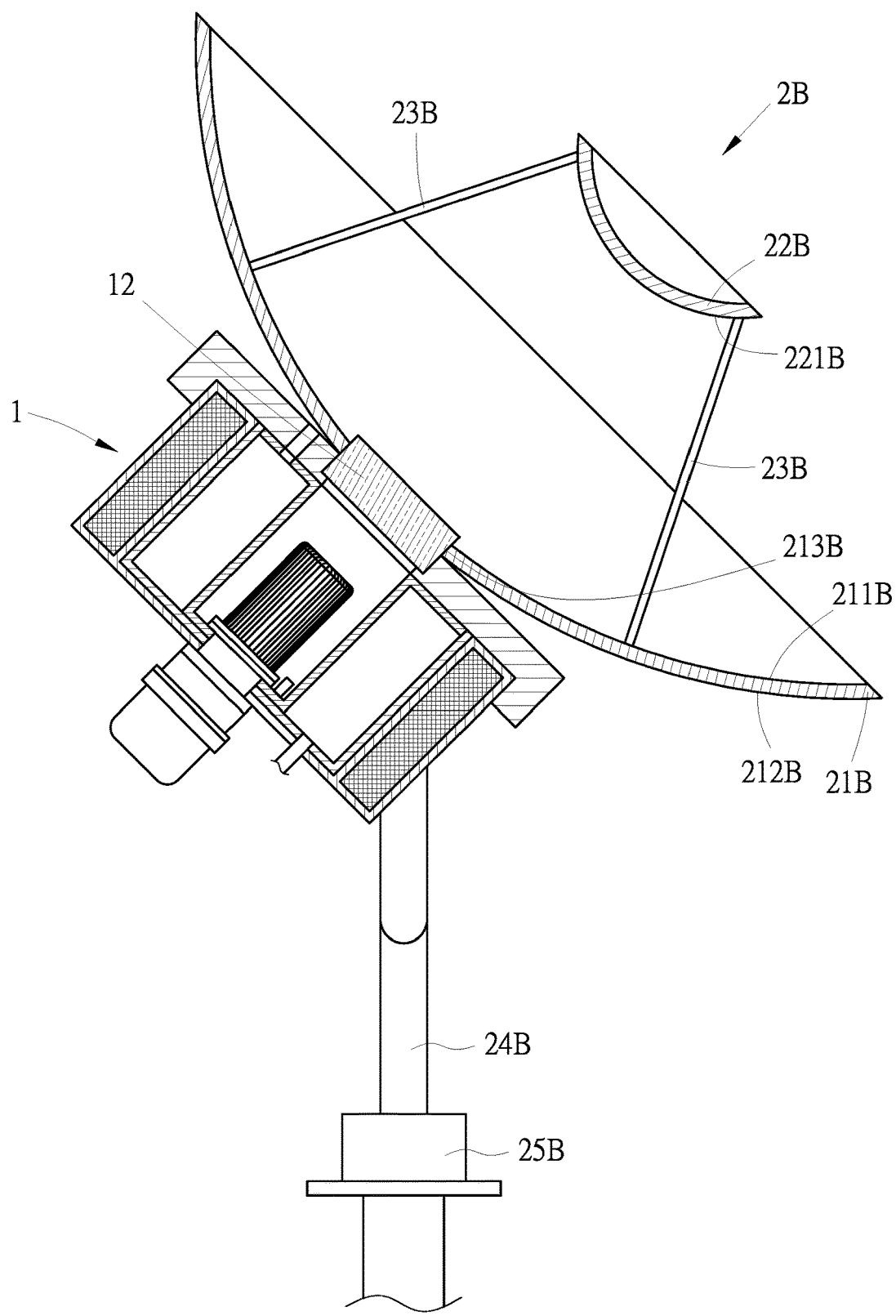
FIG. 7 is a schematic view of the apparatus combining the solar tracker and the dual heat source collector according to the second embodiment of the present invention.

FIGS. 5-7 show an apparatus combining a solar tracker and a dual heat source collector according to a second embodiment of the present invention. The solar tracker 2B has a primary mirror 21B, a secondary mirror 22B, two support frames 23B, a pivot member 24B, a driving member 25B, and two pivot blocks 26B. The primary mirror 21B has a first reflective surface 211B and a back surface 212B. The primary mirror 21B has a mounting hole 213B passing through the first reflective surface 211B and the back surface 212B. The secondary mirror 22B is mounted above the primary mirror 21B through the two support frames 23B, so that the secondary mirror 22B is higher than the primary mirror 21B. The secondary mirror 22B has a second reflective surface 221B facing the first reflective surface 211B and focusing on the mounting hole 213B. The heat engine assembly 1 is mounted on the back surface 212B of the primary mirror 21B. The heat collecting lens 12 is fixed to the mounting hole 213B. The heat collecting lens 12 extends out of the first reflective surface 211B of the primary mirror 21B. The two pivot blocks 26B are arranged on both sides of the back surface 212B of the primary mirror 21B, respectively. The heat engine assembly 1 is located between the two pivot blocks 26B. The pivot member 24B is Y-shaped. One end of the pivot member 24B is pivotally connected to the pivot blocks 26B, and the other end of the pivot member 24B is connected to the driving member 25B. It should be noted that the weight of the heat engine assembly 1 is about equal to the total weight of the primary mirror 21B, the secondary mirror 22B and the support frames 23B. The pivot blocks 26B are fixed to the back surface 212B of the primary mirror 21B so that the pivot point is located on the secondary mirror 22B, which can reduce the power output by the driving member 25B. It should be noted that the solar tracker 2B can be pivoted at the solar zenith angle through the pivot member 24B pivoted to the pivotal blocks 26B. The driving member 25B drives the pivot member 24B so that the solar tracker 2B can pivot at the solar azimuth angle. With the solar tracker 2B that can be pivoted at the solar zenith angle and the solar azimuth angle, the heat collecting lens 12 of the heat engine assembly 1 can absorb more sunlight. The operation of the second embodiment is the same as that of the first embodiment, and will not be repeated hereinafter.

Figure 8:
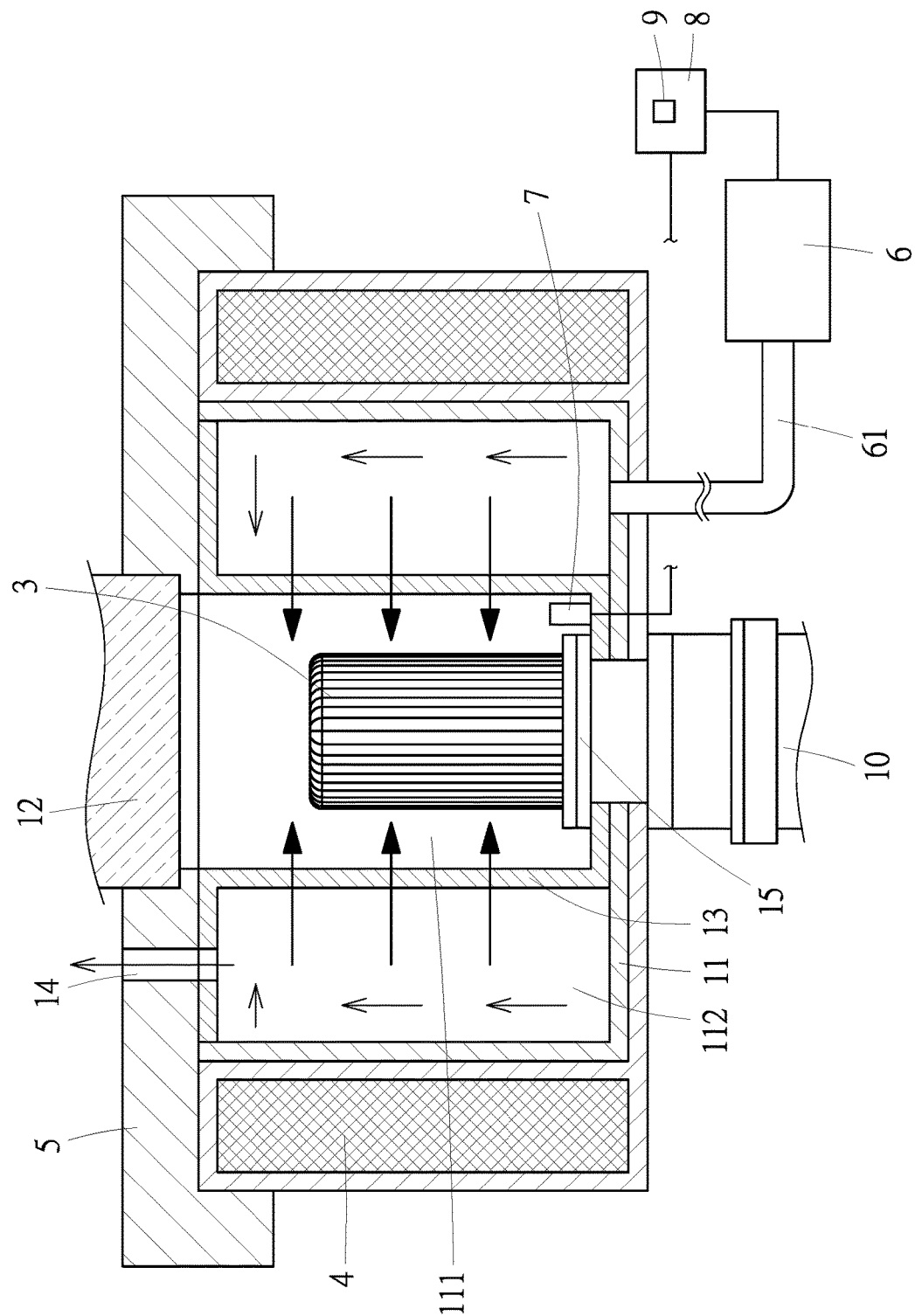
FIG. 8 is a schematic view according to the first embodiment of the present invention, providing the heat engine with the heating thermal energy from the heat source room.

Referring to FIG. 2 and FIG. 8, when there is no sunlight at night, the timer 9 can be used to set a time signal B. In summer, the sun setting time may be set to about 6 pm. In winter, the sun setting time may be set to about 4:30 pm. When the control unit 8 receives the time signal B, the control unit 8 will control the heat-generating unit 6 to start. The heat-generating unit 6 is, for example, a burner and receives a fuel to burn to generate heating thermal energy. The heating thermal energy is transmitted through a medium such as high-temperature air after the fuel is burned, and is transferred to the heat source room 112 through the conveying pipe 61. The heating thermal energy is further transferred to the solar heat collecting room 111 through the heat transfer wall 13 to maintain the operation of the heat engine 15 so that the power generation unit 10 continues to generate electricity. The heat collector 11 further has a vent 14 communicating with the heat source room 112 to exhaust the high-temperature air medium after the fuel is burned.

Figure 9:
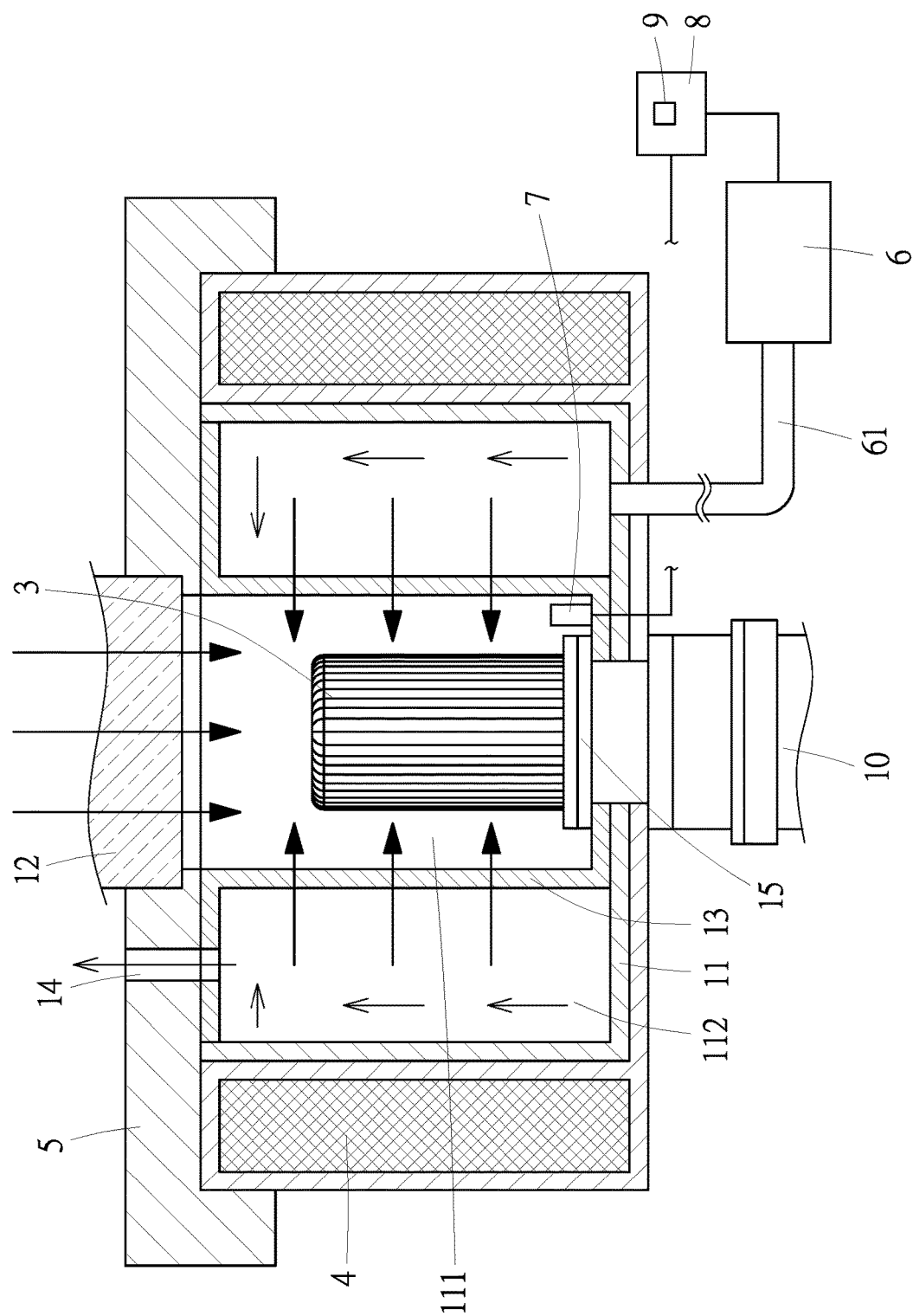
FIG. 9 is a schematic view according to the first embodiment of the present invention, providing the heat engine with the solar thermal energy from the solar heat collecting room and the heating thermal energy from the heat source room.
Figure 10:
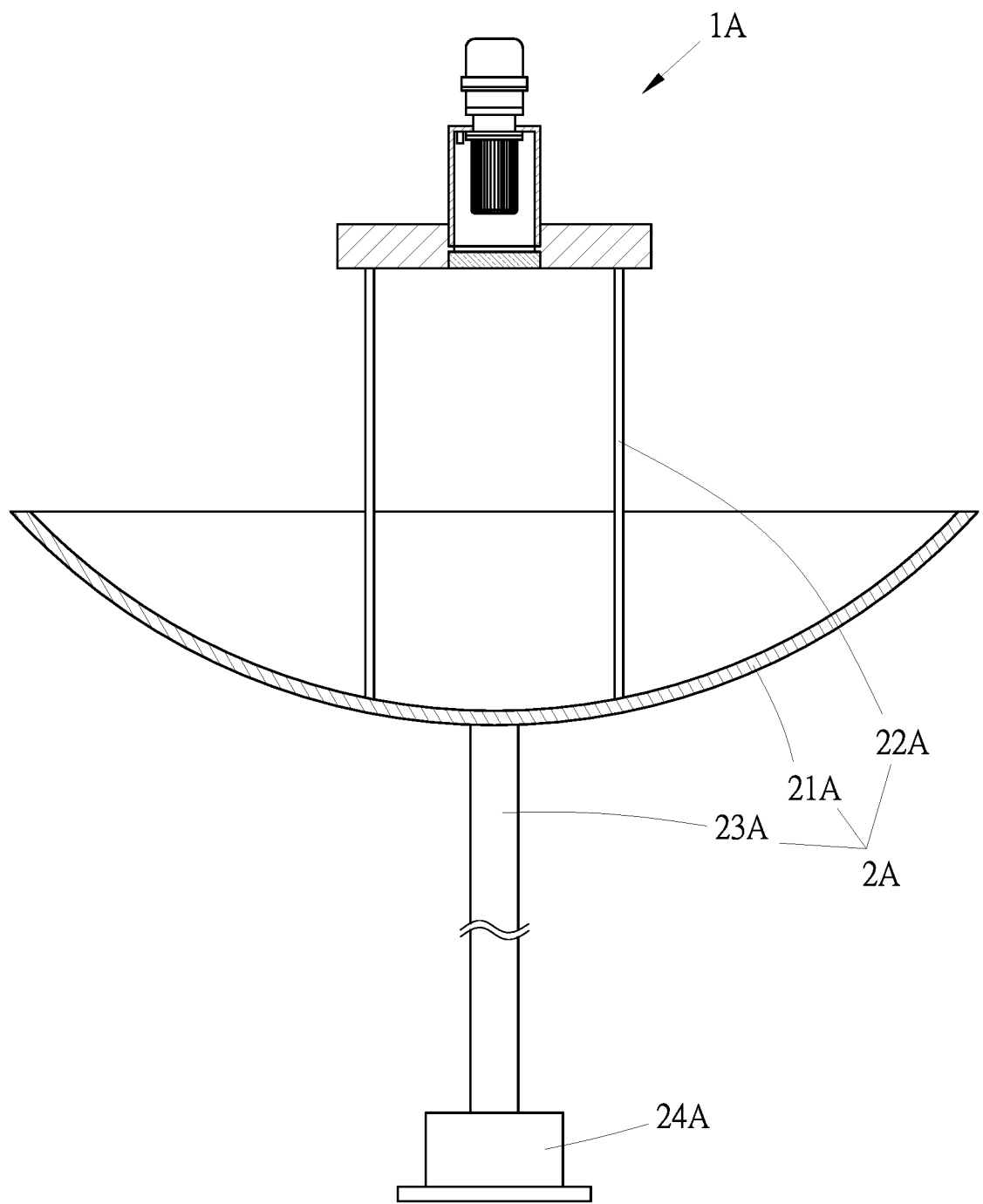
FIG. 10 is a schematic view of a conventional dish heat collector with a solar-powered Stirling engine.

Referring to FIG. 2 and FIG. 9, except for the absence of sunlight at night, when the temperature in the solar heat collecting room 111 is insufficient due to cloudy and rainy days during the day, the operating efficiency of the heat engine 15 will be affected to influence the power output of the power generation unit 10. Since the temperature sensing unit 7 is disposed in the solar heat collecting room 111, it can continuously sense the temperature in the solar heat collecting room 111 to generate a temperature signal A. The temperature signal A is transmitted to the control unit 8. When the temperature in the solar heat collecting room 111 is insufficient, the control unit 8 will control the heat-generating unit 6 to start and transfer the heating thermal energy to the solar heat collecting room 111 to increase the temperature of the solar heat collecting room 111 so as to maintain the operation of the heat engine 15, such that the power generation unit 10 continues to generate electricity.

Both the first embodiment and the second embodiment of the present invention can use the solar thermal energy or/and the heating thermal energy to drive the heat engine 15 through the dual-heat source solar heat engine according to different conditions, so that the power generation unit 10 can generate a stable electric power output.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An apparatus combining a solar tracker and a dual heat source collector, comprising:
    a heat engine assembly including a heat collector, a heat collecting lens and a heat engine, the heat collector including a solar heat collecting room and a heat source room, the heat collecting lens being arranged on the heat collector and corresponding to the solar heat collecting room, the heat collecting lens being configured to focus sunlight on the solar heat collecting room to generate a solar thermal energy, the heat source room being configured to generate or receive a heating thermal energy, a heat transfer wall being provided between the solar heat collecting room and the heat source room to separate the solar heat collecting room and the heat source room into two spaces, the heating thermal energy being transferred to the solar heat collecting room through the heat transfer wall, the heat engine being located in the solar heat collecting room;
    a heat-generating unit configured to receive a fuel to burn to generate the heating thermal energy, the heating thermal energy being transmitted to the heat source room, the heat collector further having a vent communicating with the heat source room;
    a control unit and a temperature sensing unit, the temperature sensing unit being disposed in the solar heat collecting room, the control unit being electrically connected to the temperature sensing unit and the heat-generating unit, the temperature sensing unit being configured to detect a temperature signal, the control unit receiving the temperature signal and controlling the heat-generating unit to start or shut down according to the temperature signal; and
    the solar tracker including a primary mirror, a secondary mirror, a pivot member and a driving member, the primary mirror having a first reflective surface and a back surface, the primary mirror having a mounting hole passing through the first reflective surface and the back surface, the secondary mirror being mounted above the primary mirror, the secondary mirror having a second reflective surface facing the first reflective surface and focusing on the mounting hole, the heat engine assembly being mounted to the back surface of the primary mirror, the heat collecting lens corresponding to the mounting hole, the primary mirror or the heat engine assembly being pivotally connected to the pivot member, the pivot member being connected to the driving member.

2. The apparatus as claimed in claim 1, wherein the heat collecting lens is a Fresnel lens.

3. The apparatus as claimed in claim 1, wherein the heat collecting lens is insertedly disposed in the mounting hole and extends out of the first reflecting surface of the primary mirror.

4. The apparatus as claimed in claim 1, wherein the secondary mirror has a surface area greater than that of the heat collecting lens.

5. The apparatus as claimed in claim 1, further comprising a heat absorption member disposed in the solar heat collecting room and connected to the heat engine, the heat absorption member being configured to receive the solar thermal energy or/and the heating thermal energy.

6. The apparatus as claimed in claim 1, wherein an outer wall of the heat source room is wrapped with a heat insulation layer.

7. The apparatus as claimed in claim 1, further comprising a timer, the control unit being electrically connected to the timer and the heat-generating unit, the timer being configured to set a time signal, the control unit receiving the time signal and controlling the heat-generating unit to start or shut down according to the time signal.

8. An apparatus combining a solar tracker and a dual heat source collector, comprising:

a heat engine assembly including a heat collector, a heat collecting lens and a heat engine, the heat collector including a solar heat collecting room and a heat source room, the heat collecting lens being arranged on the heat collector and corresponding to the solar heat collecting room, the heat collecting lens being configured to focus sunlight on the solar heat collecting room to generate a solar thermal energy, the heat source room being configured to generate or receive a heating thermal energy, a heat transfer wall being provided between the solar heat collecting room and the heat source room to separate the solar heat collecting room and the heat source room into two spaces, the heating thermal energy being transferred to the solar heat collecting room through the heat transfer wall, the heat engine being located in the solar heat collecting room;

a heat-generating unit configured to receive a fuel to burn to generate the heating thermal energy, the heating thermal energy being transmitted to the heat source room, the heat collector further having a vent communicating with the heat source room;

a control unit and a temperature sensing unit, the temperature sensing unit being disposed in the solar heat collecting room, the control unit being electrically connected to the temperature sensing unit and the heat-generating unit, the temperature sensing unit being configured to detect a temperature signal, the control unit receiving the temperature signal and controlling the heat-generating unit to start or shut down according to the temperature signal; and the solar tracker including a primary mirror, a secondary mirror, a pivot member, a driving member and a pivot block, the primary mirror having a first reflective surface and a back surface, the primary mirror having a mounting hole passing through the first reflective surface and the back surface, the secondary mirror being mounted above the primary mirror, the secondary mirror having a second reflective surface facing the first reflective surface and focusing on the mounting hole, the heat engine assembly being mounted to the back surface of the primary mirror, the heat collecting lens corresponding to the mounting hole, the pivot block being connected to the back surface of the primary mirror, the pivot member being pivotally connected to the pivot block, the pivot member being connected to the driving member.

\* \* \* \* \*